US007800243B2

(12) United States Patent
Bendixen et al.

(10) Patent No.: US 7,800,243 B2
(45) Date of Patent: Sep. 21, 2010

(54) VARIABLE SPEED WIND TURBINE WITH DOUBLY-FED INDUCTION GENERATOR COMPENSATED FOR VARYING ROTOR SPEED

(75) Inventors: Flemming Buus Bendixen, Hobro (DK); Gert Karmisholt Andersen, Horsens (DK); Kim Brondum Larsen, Hadsund (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/606,807

(22) Filed: Oct. 27, 2009

(65) Prior Publication Data

US 2010/0045040 A1 Feb. 25, 2010

Related U.S. Application Data

(63) Continuation of application No. PCT/DK2008/000168, filed on Apr. 30, 2008.

(60) Provisional application No. 60/915,836, filed on May 3, 2007.

(30) Foreign Application Priority Data

Apr. 30, 2007 (DK) .......................... PA 2007 00654

(51) Int. Cl.
*H02P 9/00* (2006.01)
(52) U.S. Cl. ............................... 290/44; 290/55; 322/20
(58) Field of Classification Search .................... 290/43, 290/44, 54, 55; 322/20, 37
See application file for complete search history.

(56) References Cited

U.S. PATENT DOCUMENTS 5,083,039 A 1/1992 Richardson et al.

(Continued)

FOREIGN PATENT DOCUMENTS

WO 9624188 A1 8/1996

(Continued)

OTHER PUBLICATIONS

Andreas Petersson; "Analysis, Modeling and Control of Doubly-Fed Induction Generators for Wind Turbines"; Department of Electric Power Engineering; Chalmers University of Technology; Göteborg, Sweden; 2003; 134 pages.

(Continued)

*Primary Examiner*—Nicholas Ponomarenko
(74) *Attorney, Agent, or Firm*—St. Onge Steward Johnston & Reens LLC

(57) ABSTRACT

A variable rotational speed wind turbine includes a doubly-fed induction generator, a rotor current controller for controlling the rotor currents of the generator, a compensation mechanism having a computation mechanism, and an input mechanism for providing input to the compensation mechanism, the input being representative of at least the instantaneous angular speed of the rotor of the generator. The computation mechanism is arranged to compute an instantaneous compensation control output in dependency of the instantaneous angular speed of the rotor of the generator and feed the compensation control output to the rotor, and to compute the compensation control output during operation of the wind turbine to compensate at least partly for dependencies on the rotor angular speed of the locations of poles of a generator transfer function, thus making a resulting generator transfer function substantially independent of variations in the rotor angular speed during operation of the wind turbine.

16 Claims, 11 Drawing Sheets

U.S. PATENT DOCUMENTS

| | | | | |
|---|---|---|---|---|
| 7,023,160 | B2* | 4/2006 | Virtanen et al. | 318/400.07 |
| 7,095,131 | B2* | 8/2006 | Mikhail et al. | 290/44 |
| 7,239,036 | B2* | 7/2007 | D'Atre et al. | 290/44 |
| 7,304,400 | B2* | 12/2007 | Kang et al. | 290/44 |
| 7,417,333 | B2* | 8/2008 | Miller et al. | 290/44 |
| 7,453,242 | B2* | 11/2008 | Ichinose et al. | 322/29 |
| 7,471,007 | B2* | 12/2008 | Bucker et al. | 290/44 |
| 7,531,910 | B2* | 5/2009 | Flottemesch et al. | 290/44 |
| 7,595,563 | B2* | 9/2009 | Wobben | 290/44 |

FOREIGN PATENT DOCUMENTS

| | | |
|---|---|---|
| WO | 9907996 A1 | 2/1999 |
| WO | 2004042889 A1 | 5/2004 |
| WO | 2004098261 A2 | 11/2004 |
| WO | 2006030183 A1 | 3/2006 |

OTHER PUBLICATIONS

F. Poitiers, M. Machmoum, R. le Doeuff and M.E. Zaim; "Control of a Doubly-Fed Induction Generator for Wind Energy Conversion Systems"; Ecole Polytechnique del-Université de Nantes, Saint Nazaire, France; 2001; 6 pages.

Danish Search Report; PA 2007 00654; Nov. 28, 2007; 1 page.

International Search Report & Written Opinion of the International Searching Authority; PCT/DK2008/000168; Oct. 23, 2008; 13 pages.

Song Wang and Yunshi Ding; "Stability Analysis of Field Oriented Doubly-Fed Induction Machine Drive Based on Computer Simulation"; Department of Electrical Drive Automation; Automation Research Institute of Ministry of Metallurgical Industry; Beijing, People's Republic of China; 1993; 14 pages.

Tapia, et al.; "Wind Generation Optimisation Algorithm for a Doubly Fed Induction Generator"; IEE Proc.-Gener. Transm. Distrib., vol. 152, No. 2, Mar. 2005; 12 pages.

* cited by examiner

VARIABLE SPEED WIND TURBINE WITH DOUBLY-FED INDUCTION GENERATOR COMPENSATED FOR VARYING ROTOR SPEED

CROSS-REFERENCE TO RELATED APPLICATIONS

The present application is a continuation of pending International patent application PCT/DK2008/000168 filed on Apr. 30, 2008 which designates the United States and claims priority from U.S. Provisional Patent Application Ser. No. 60/915,836 filed on May 3, 2007 and Danish patent application PA 2007 00654 filed on Apr. 30, 2007, the content of which is incorporated herein by reference.

FIELD OF THE INVENTION

The present invention relates to a variable speed wind turbine comprising a doubly-fed induction generator and a method for compensating the generator for varying rotor speed.

BACKGROUND OF THE INVENTION

Generally, commercial wind turbines can be divided into fixed speed turbines and variable speed turbines.

For a fixed speed turbine, the power production is only optimized for one specific wind speed, whereas for a variable speed turbine, optimal power output can be achieved for a wider range of wind speeds.

Since the late 1990's, the main part of the implemented larger wind turbines have been variable speed turbines, which require more complex electrical systems than fixed speed turbines. Also, newer grid requirements add to the complexity of the electrical systems of a modern wind turbine.

A full range variable speed turbine can be achieved by connecting the stator of the generator of the wind turbine to the grid through an AC-AC converter (such as a back-to-back converter or a matrix converter) changing the electrical output from the generator output frequency to the nominal grid frequency. An advantage of such a system is that, at least in principle, the full speed range from zero RPM to the maximum speed allowed for safety reasons can be used for production of electrical power. A disadvantage, on the other hand, is that the AC-AC converter must be rated to handle the full output power of the turbine.

In order to reduce the requirements of the AC-AC converter, it is known to use limited range variable speed systems, such as doubly-fed induction generator (DFIG) systems.

In a standard DFIG system, the stator is connected directly to the grid, normally via a transformer, while the rotor is connected to the grid via slip rings and an AC-AC converter. The limitations on the speed range of the system depend on the AC-AC converter, since the amount of power through the rotor is proportional to the difference between the electrical rotor speed and the synchronous speed (stator field speed) of the generator. Here and in the following, the term "electrical rotor speed" refers to the product of the mechanical rotor speed and the number of pairs of poles in the rotor.

The DFIG system suffers from a well-known disadvantage, namely poorly damping of oscillations within the flux dynamics due to cross coupling between active and reactive currents, which makes the system potentially unstable under certain circumstances and complicates the work of the rotor current controller, whose main task is to limit the rotor current in order to prevent the AC-AC converter from tripping or breaking down. It should be noted, that although the rotor current controller is in fact a current controller, the output control signal from the controller can comprise one or more voltages as well as currents, since the rotor currents can very well be controlled indirectly by controlling the rotor voltages.

A traditional way of avoiding oscillations is to reduce the bandwidth of the rotor current controller by a certain factor compared to the bandwidth of the power loops within the system, which however causes the rotor current controller to react slower to changes in the grid conditions. Furthermore, the controller performance (bandwidth, rise time etc.) depends on the rotor speed, which in best case results in high qualification and test costs and in worst case can cause controller instability and hardware failure.

The paper: "Control of a Doubly-Fed Induction Generator for Wind Energy Conversion Systems" (F. Poitiers, M. Machmoum, R. le Doeuff and M. E. Zaim, Ecole Polytechnique de l' Université de Nantes, Saint Nazaire, France) describes the control of electrical power exchanged between the stator and the grid by controlling active and reactive power, respectively. A model of a DFIG system is disclosed and a block diagram of the power control is shown. However, it is stated in the paper that the cross coupling between active and reactive power is of small influence and can be neglected, which is not in accordance with the common experience of most people working with modern wind turbines.

In the paper: "Stability Analysis of Field Oriented Doubly-Fed Induction Machine Drive Based on Computer Simulation" (Song Wang and Yunshi Ding, Department of Electrical Drive Automation, Automation Research Institute of Ministry of Metallurgical Industry, Beijing, People's Republic of China, 1993), computer simulations of different operational characteristics of a model of a DFIG system is presented. The simulation model introduces a voltage feed-forward function that weakens the cross coupling between the currents along the d- and q-axes, respectively. An actual compensation method, however, is not disclosed.

The Ph.D. Thesis: "Analysis, Modeling and Control of Doubly-Fed Induction Generators for Wind Turbines" (Andreas Petersson, Department of Electric Power Engineering, Chalmers University of Technology, Göteborg, Sweden, 2003) discloses a range of different methods for cross coupling compensation, all dealing with the oscillation and bandwidth problems. The methods mentioned all suffer from disadvantages, such as necessary differentiation of measured signals, reduction of rotor current controller bandwidth, need of extra inverter hardware etc.

International patent application WO 2004/098261 discloses a variable speed wind turbine with a DFIG, a rotor current controller of which regulates the flux-producing rotor current in order to secure that the wind turbine can stay connected ("ride through") in the case of voltage fluctuations and/or transients on the utility grid. This system, however, does not provide any solution to the above-mentioned problem of potential instability of the system due to oscillations in the flux dynamics.

Since oscillation problems in the drive trains of wind turbines have been known for several years, different solutions have been suggested to solve or at least reduce these problems. One system for controlling drive train damping features based on the generator rotor speed in a wind turbine with a DFIG is disclosed in International patent application WO 99/07996. Here, a torque command generator with a feed-forward damping filter is used to generate a commanded torque in response to the measured generator rotor speed, the torque being controlled via the rotor current by a torque controller, and a PID controller performs pitch regulation based on the difference between the actual generator rotor speed and a target generator rotor speed.

An objective of the present invention is to provide a Doubly-Fed Induction Generator (DFIG) system in which the above-discussed possible oscillations may be controlled or substantially avoided in an improved manner.

Another objective of the present invention is to provide a DFIG system with improved ability to control the quality of the power output, which is necessary to meet the newest grid demands.

Also, it is an objective of the present invention to provide a compensated DFIG system that requires neither differentiation of measured signals nor extra hardware compared to traditional DFIG systems.

SUMMARY OF THE INVENTION

The present invention relates to a variable rotational speed wind turbine comprising
 a wind turbine rotor comprising one or more blades,
 a doubly-fed induction generator coupled to the wind turbine rotor,
 a rotor current controller arranged to control the currents of a rotor of the generator,
 compensation means having computation means, and
 means for providing input to the compensation means, the input being representative of at least the instantaneous angular speed of the rotor of the generator,
 wherein the computation means is arranged to compute an instantaneous compensation control output in dependency of said instantaneous angular speed of the rotor of the generator and feed the compensation control output to the rotor of the generator, the computation means being arranged to compute said compensation control output during operation of the wind turbine to compensate at least partly for dependencies on the rotor angular speed of the locations of poles of a generator transfer function, thus making a resulting generator transfer function substantially independent of variations in the rotor angular speed during operation of the wind turbine.

It should be noted that the problem of oscillations in the flux dynamics of the generator is hereby solved indirectly, i.e. by controlling the instantaneous resulting transfer function of the generator, said transfer function mainly being constituted by the relations between active and reactive rotor and stator currents of the generator.

The input for the compensation means being representative of the instantaneous angular speed of the rotor could be an output from an encoder registering the angular speed of the wind turbine rotor, or it could be one or more rotor currents or voltages or a reference current or voltage, whose frequency reflects the angular speed of the generator rotor.

In an embodiment of the invention, the compensation control output is added to an output from the rotor current controller.

This is advantageous in that the rotor current controller will work on the resulting generator transfer function of the compensated generator system and, thus, compensation means are not needed within the controller.

In an embodiment of the invention, the means for providing input to the compensation means furthermore provides input representing electrical quantities, such as currents and voltages.

In an embodiment of the invention, said input includes a rotor reference.

In an embodiment of the invention, said input furthermore includes stator currents.

In an embodiment of the invention, said input furthermore includes rotor currents.

The stator and rotor currents used as input for the compensation means may be active as well as reactive. The input may include any combination of the measured stator and rotor currents and the rotor reference current and/or other currents and voltages measured from the DFIG system is used as input for the compensation means.

Since, as mentioned above, the stator and rotor currents all influence the flux dynamics of the system, it is relevant to use them as input and control parameters for the compensation means.

In a preferred embodiment of the invention, the transfer function of the compensation means furthermore is designed for computing the control output so that the rotor currents are effectively decoupled into two mutually orthogonal components that may be controlled substantially independently by the rotor current controller.

Arranging the compensation means transfer function to provide a control output that effectuates a decoupling of the rotor currents into two mutually orthogonal components is advantageous in that it enables the currents to be controlled individually by the rotor current controller, so that a more precise control of the rotor currents and thereby of the stator currents and the power delivered to the network may be obtained. A complete or at least nearly complete decoupling of the current components may be obtained due to the provision of the rotor angle speed independency.

In a preferred embodiment of the invention, the compensation means comprises means for providing damping of oscillations of the control output.

In yet a further preferred embodiment of the invention, the means for providing damping of oscillations of the control output comprises one or more lead filters.

Using lead filters for increasing the phase of the output control signal from the compensation means around the potential oscillation frequency is advantageous in that it minimizes the oscillations around this frequency and, thus, the instability of the control system considerably.

In an embodiment of the invention, the means for providing damping of oscillations are designed to provide damping at a frequency that deviates less than 5% from the grid frequency.

In another embodiment of the invention, the means for providing damping of oscillations are tuneable to one or more well-defined frequencies.

In another aspect of the invention, it relates to a method for operating a variable rotational speed wind turbine having a doubly-fed induction generator coupled to a rotor of the wind turbine, comprising the steps of:
 providing input to compensation means, the input being representative of at least the instantaneous angular speed of the rotor of the generator,
 arranging computation means of the compensation means to compute an instantaneous compensation control output in dependency of said instantaneous angular speed of the rotor of the generator during operation of the wind turbine to compensate at least partly for dependencies on the rotor angular speed of the locations of poles of a generator transfer function, thus making a resulting generator transfer function substantially independent of variations in the rotor angular speed during operation of the wind turbine, and
 feeding the compensation control output to the rotor of the generator.

In a further embodiment of the invention, the method further comprises the step of arranging the computation means for computing the control output so that the rotor currents are effectively decoupled into two mutually orthogonal components that may be controlled substantially independently by the rotor current controller.

In a preferred embodiment of the invention, the method further comprises a step of arranging the compensation means for providing damping of oscillations of the control output.

In yet a preferred embodiment of the invention, the provided damping of oscillations is tuneable to one or more well-defined frequencies.

BRIEF DESCRIPTION OF THE DRAWINGS

An embodiment of the invention will be described in the following with reference to the figures in which.

The appended figures are provided for illustrating an embodiment of the present invention and are not intended to limit the scope of protection as defined by the claims.

DETAILED DESCRIPTION OF THE INVENTION

In the following is disclosed an embodiment of the present invention with compensation means for making the generator transfer function independent of varying rotor speed, comprising a lead filter for damping oscillations around the grid frequency.

Figure 1:
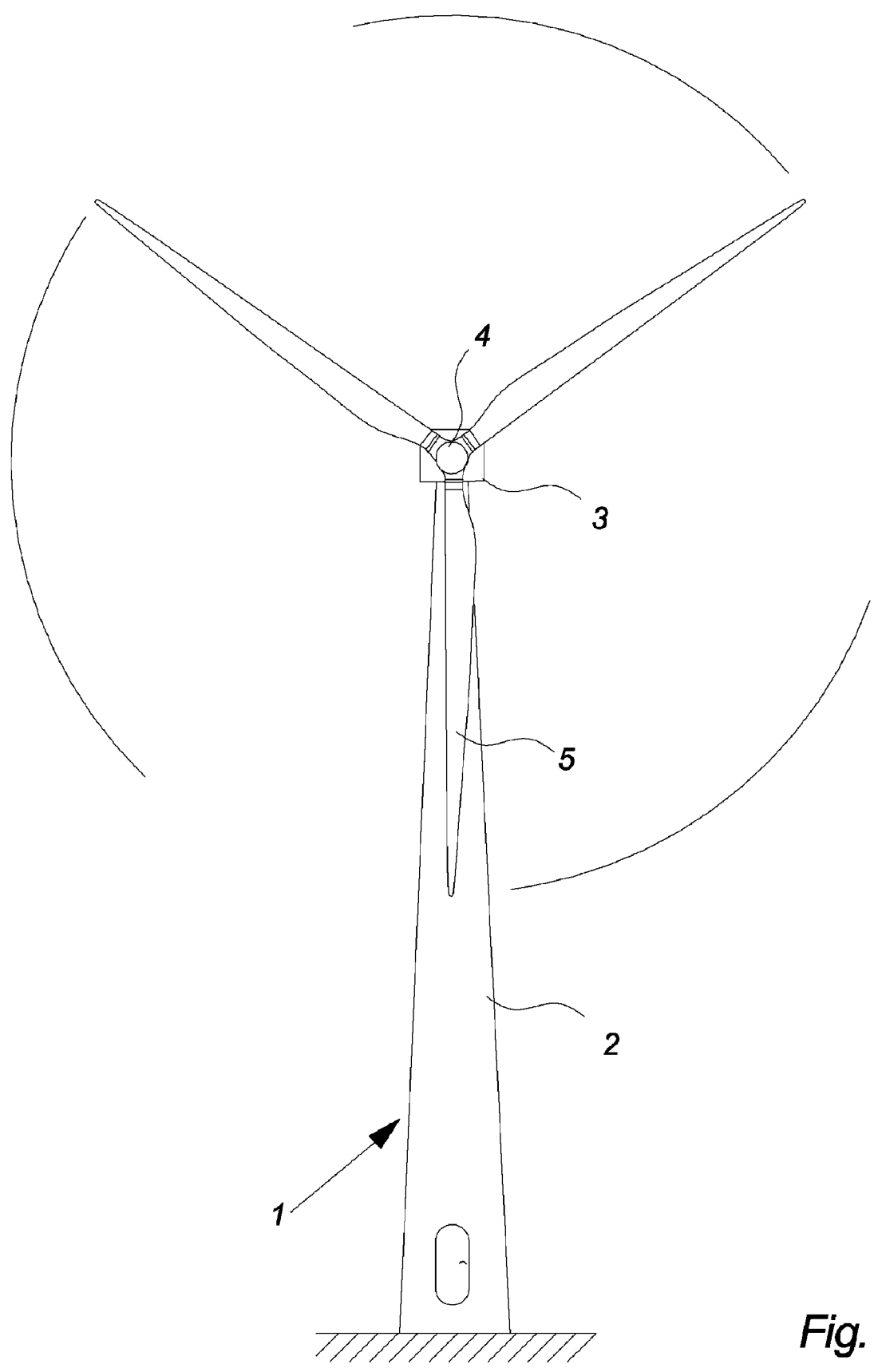
FIG. 1 illustrates a large modern wind turbine as seen from the front.

FIG. 1 illustrates a modern wind turbine 1, comprising a tower 2 and a wind turbine nacelle 3 positioned on top of the tower 2. The wind turbine rotor 4 comprising three wind turbine blades 5 is connected to the nacelle 3 through the low speed shaft (not shown) which extends from the front of the nacelle 3.

Figure 2:
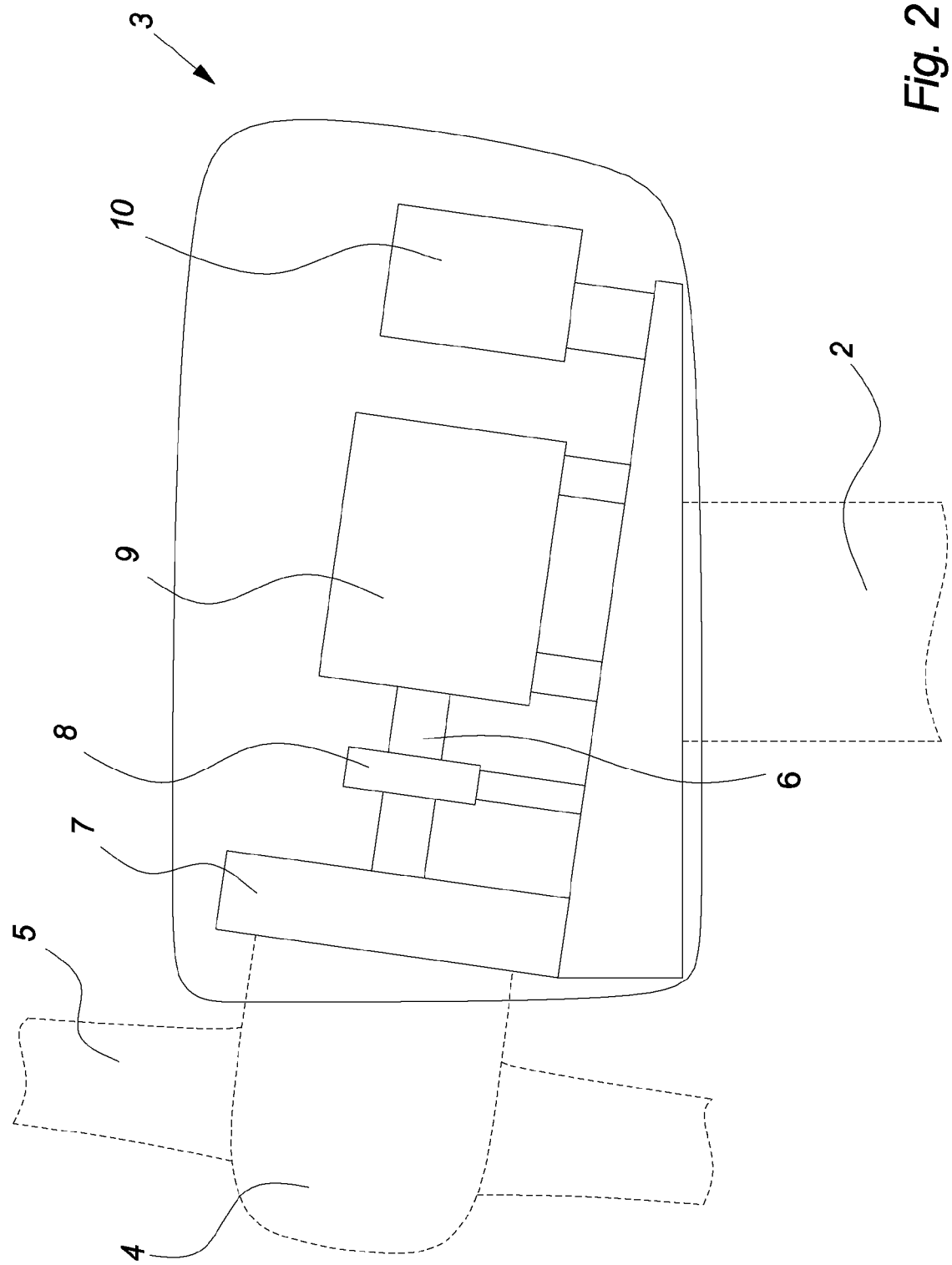
FIG. 2 illustrates a cross section of a simplified nacelle showing the drive train as seen from the side.

FIG. 2 illustrates a simplified cross section of a wind turbine nacelle 3, as seen from the side. In the shown embodiment, the drive train 6 in the nacelle 3 comprises a gear 7, a breaking system 8, a generator 9 and an AC-AC converter 10.

Figure 3:
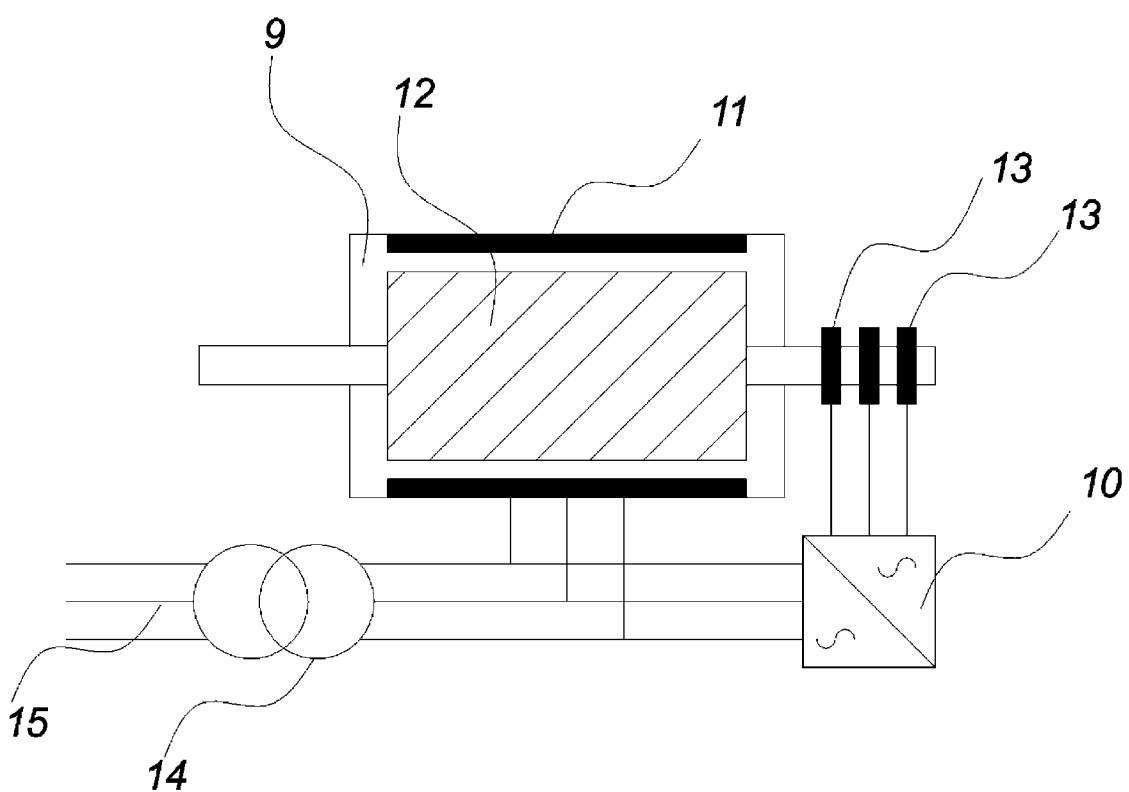
FIG. 3 illustrates the principle schematics of a standard doubly-fed induction generator.

The principle schematics of a standard Doubly-Fed Induction Generator 9 is illustrated in FIG. 3, where the stator 11 is connected to the grid 15 via a grid transformer 14 and the rotor 12 is connected to the grid 15 via slip rings 13, an AC-AC converter 10 and the grid transformer 14.

Figure 4:
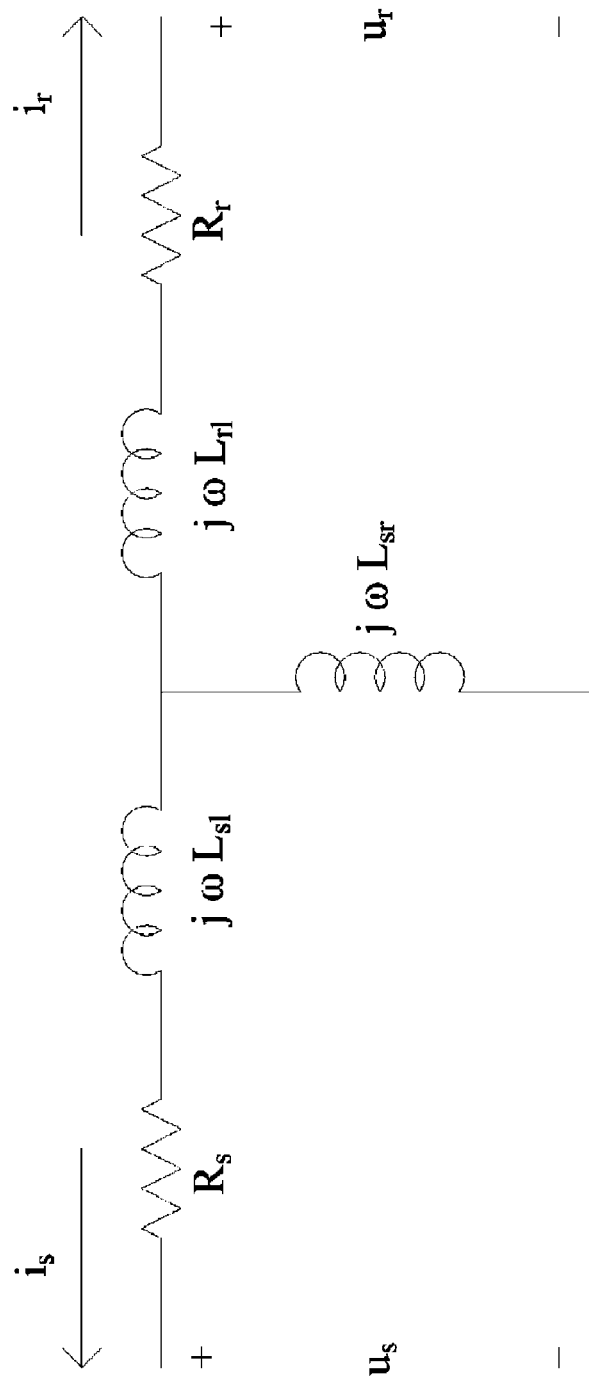
FIG. 4 illustrates the standard steady state T-equivalent diagram for a doubly-fed induction generator.

FIG. 4 illustrates the standard steady state T-equivalent diagram for a doubly-fed induction generator, where $u_s$, $i_s$, $R_s$, and $L_{sl}$ are the stator voltage, stator current, stator resistance and stator leakage inductance, respectively. Similarly, $u_r$, $i_r$, $R_r$ and $L_{rl}$ are the rotor voltage, rotor current, rotor resistance and rotor leakage inductance, respectively. $L_{sr}$ is the magnetizing inductance. All generator parameters are transferred to fixed stator voltage reference frame.

Figure 5A:
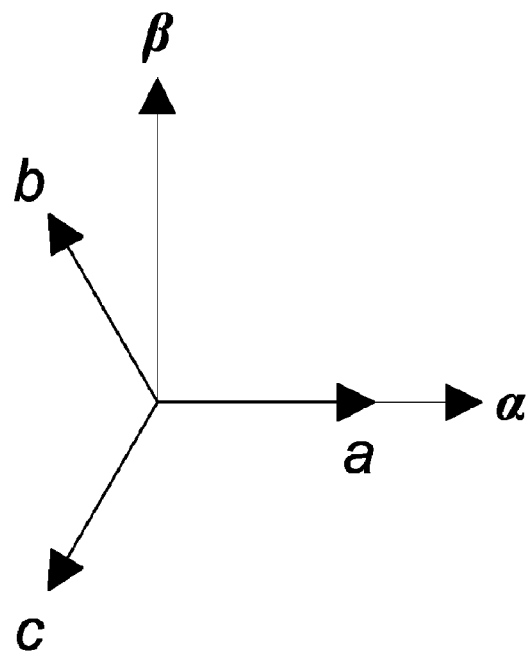
FIG. 5a illustrates the Clarke Transformation of vectors from a balanced three-phase system into a balanced two-phase orthogonal stationary system.
Figure 5B:
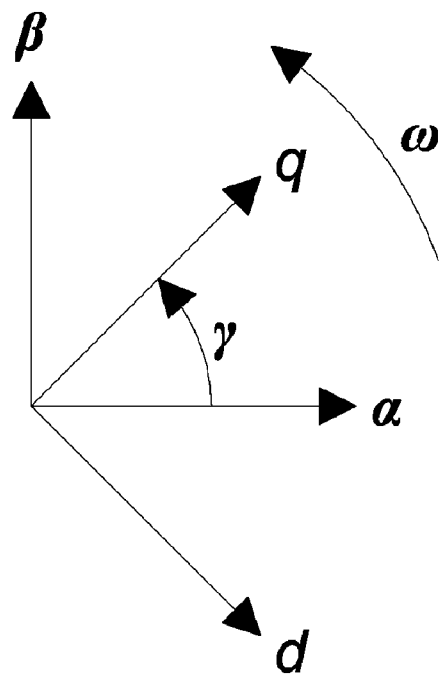
FIG. 5b illustrates the Park Transformation of vectors from a balanced two-phase orthogonal stationary system into a balanced two-phase orthogonal rotating system.

In the following, the currents and voltages will all be referred to in a balanced orthogonal two-phase rotating reference frame, namely the so-called dq system of coordinates. FIGS. 5a and 5b illustrates the two steps of transformation of the quantities from a balanced three-phase system into the dq system.

The first step, which is known as the Clarke Transformation, converts balanced three-phase quantities into balanced two-phase quadrature quantities as illustrated in FIG. 5a. The relations between the three-phase quantities (a, b and c) and the two-phase quantities ($\alpha$ and $\beta$) are given by the equations:

$$\alpha = a \quad (1)$$
$$\beta = \frac{1}{\sqrt{3}}(b - c)$$
$$0 = a + b + c$$

and $$a = \alpha \quad (2)$$
$$b = -\frac{1}{2}(\alpha - \sqrt{3} \cdot \beta)$$
$$c = -\frac{1}{2}(\alpha + \sqrt{3} \cdot \beta)$$

The second step, known as the Park Transformation, converts quantities from a stationary two-phase system into a rotating two-phase system as illustrated in FIG. 5b. The relations between the quantities in the stationary system ($\alpha$ and $\beta$) and the quantities in the rotating system (d and q) are given by the equations:

$$\alpha = q \cdot \cos \gamma + d \cdot \sin \gamma$$
$$\beta = q \cdot \sin \gamma - d \cdot \cos \gamma \quad (3)$$

and $$q = \alpha \cdot \cos \gamma + \beta \cdot \sin \gamma$$
$$d = \alpha \cdot \sin \gamma - \beta \cdot \cos \gamma \quad (4)$$

where $\gamma$ is the rotation angle between the stationary and the rotating system.

Using the subscript $_{sf}$ to indicate that the variable is given in a stator voltage fixed reference frame, a transient (dynamic) model of a standard doubly-fed induction generator can be written in dq coordinates as follows:

$$u_{ds\_sf} = (R_s + L_s s)i_{ds\_sf} - L_{sr} s i_{dr\_sf} + \omega(L_s i_{qs\_sf} + L_{sr} i_{qr\_sf})$$

$$u_{qs\_sf} = -(R_s + L_s s)i_{qs\_sf} - L_{sr} s i_{qr\_sf} + \omega(L_s i_{ds\_sf} + L_{sr} i_{dr\_sf})$$

$$u_{dr\_sf} = -L_{sr} s i_{ds\_sf} - (R_r + L_r s)i_{dr\_sf} + (\omega - \omega_r)(L_{sr} i_{qs\_sf} + L_r i_{qr\_sf})$$

$$u_{qr\_sf} = -L_{sr} s i_{qs\_sf} - (R_r + L_r s)i_{qr\_sf} + (\omega - \omega_r)(L_{sr} i_{ds\_sf} + L_r i_{dr\_sf}) \quad (5)$$

In the above equations as well as in the following, $\omega$ is the stator field speed (grid frequency) and $\omega_r$ is the electrical rotor speed. The transient stator inductance $L_s$ and the transient rotor inductance $L_r$ used in the equations can be calculated from the inductances shown in FIG. 4 by the following equations:

$$L_s = L_{sl} + L_{sr}$$

$$L_r = L_{rl} + L_{sr} \quad (6)$$

In state space matrix notation, the equations (5) will have the following form:

$$s \begin{bmatrix} i_{ds\_sf} \\ i_{qs\_sf} \\ i_{dr\_sf} \\ i_{qr\_sf} \end{bmatrix} = M_i \cdot \begin{bmatrix} i_{ds\_sf} \\ i_{qs\_sf} \\ i_{dr\_sf} \\ i_{qr\_sf} \end{bmatrix} + (-M_u) \cdot \begin{bmatrix} u_{ds\_sf} \\ u_{qs\_sf} \\ u_{dr\_sf} \\ u_{qr\_sf} \end{bmatrix} \quad (7)$$

$$\begin{bmatrix} fi_{ds\_sf} \\ fi_{qs\_sf} \\ fi_{dr\_sf} \\ fi_{qr\_sf} \end{bmatrix} = I_{\{4 \times 4\}} \cdot \begin{bmatrix} i_{ds\_sf} \\ i_{qs\_sf} \\ i_{dr\_sf} \\ i_{qr\_sf} \end{bmatrix} + 0_{\{4 \times 4\}} \cdot \begin{bmatrix} u_{ds\_sf} \\ u_{qs\_sf} \\ u_{dr\_sf} \\ u_{qr\_sf} \end{bmatrix}$$

where the included matrices $M_u$ and $M_i$ are given by:

$$M_u = \frac{1}{L_s \cdot L_r - L_{sr}^2} \begin{bmatrix} L_r & 0 & -L_{sr} & 0 \\ 0 & L_r & 0 & -L_{sr} \\ -L_{sr} & 0 & L_s & 0 \\ 0 & -L_{sr} & 0 & L_s \end{bmatrix} \quad (8)$$

$$M_i = \frac{1}{L_s \cdot L_r - L_{sr}^2} \begin{bmatrix} -L_r \cdot R_s & \omega \cdot L_s \cdot L_r - (\omega - \omega_r) \cdot L_{sr}^2 & L_{sr} R_r & \omega_r \cdot L_r L_{sr} \\ -\omega \cdot L_s \cdot L_r + (\omega - \omega_r) \cdot L_{sr}^2 & -L_r \cdot R_s & -\omega_r \cdot L_r L_{sr} & L_{sr} R_r \\ L_{sr} R_s & -\omega_r \cdot L_s L_{sr} & -L_s \cdot R_r & (\omega - \omega_r) \cdot L_s \cdot L_r - \omega \cdot L_{sr}^2 \\ \omega_r \cdot L_s L_{sr} & L_{sr} R_s & -(\omega - \omega_r) \cdot L_s \cdot L_r + \omega \cdot L_{sr}^2 & -L_s \cdot R_r \end{bmatrix}$$

The main problems of a standard DFIG system as described by the equations above all lie in the off-diagonal elements of $M_i$, which is the dynamic matrix representing the relations between the different currents in the state space equations of the system.

Firstly, some of the off-diagonal elements are non-linear because of the dependency on the varying rotor speed, which means that the current controllers cannot be designed and analyzed by linear control theory.

Secondly, the same dependency of some of the off-diagonal elements on the electrical rotor speed is a potential cause of instability of the system with uncontrolled signals, especially in the case of high accelerations, because the poles and zeros of the system created by these off-diagonal elements move with changing rotor speed and are poorly damped.

Furthermore, the off-diagonal elements of $M_i$ cause cross coupling between the currents so that the currents along the d and q axes, respectively, cannot be controlled independently.

According to the present invention, compensation means are added to the system in order to remove or at least decrease the movement of the poles and zeros when the rotor speed changes. Here, it has to be realized that since the current controller can change only the rotor voltages, not all off-diagonal elements can be removed from the dynamic matrix $M_i$ in the state space equations (7) of the system.

Figure 6:
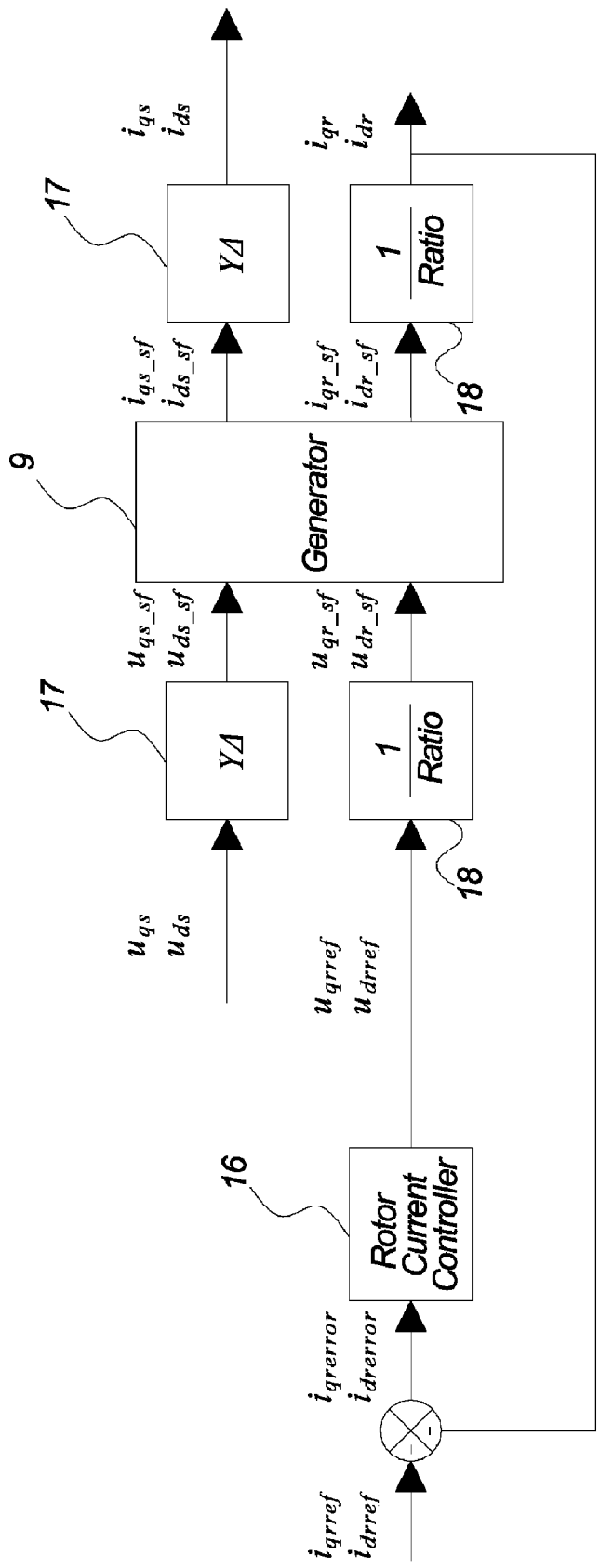
FIG. 6 illustrates a model of a doubly-fed induction generator, extended to include the rotor current controller and the measurement points, where actual currents and voltages are available.

Before the compensation means can be added, however, the generator model must be extended to include the measurement points, where the actual currents and voltages used in the compensation are available as illustrated in FIG. 6. For this extension of the generator model, two things must be taken into consideration.

Firstly, the windings of the generator can be connected in either star configuration or delta configuration. The choice of configuration affects the voltages by a factor $\sqrt{3}$. Thus, a scaling factor 17 marked "YΔ" in FIG. 6 has the value 1 if the generator is connected in star configuration, and it has the value $\sqrt{3}$ if the generator is connected in delta configuration.

Secondly, as previously mentioned, the generator equations are based on a stator voltage fixed reference frame. Therefore, since the rotor currents and the rotor voltages are actually measured on the rotor side of the generator, a scaling factor 18 marked "Ratio" representing the transformation factor from stator to rotor voltages must be implemented in the extended generator model as also shown in FIG. 6.

Figure 7:
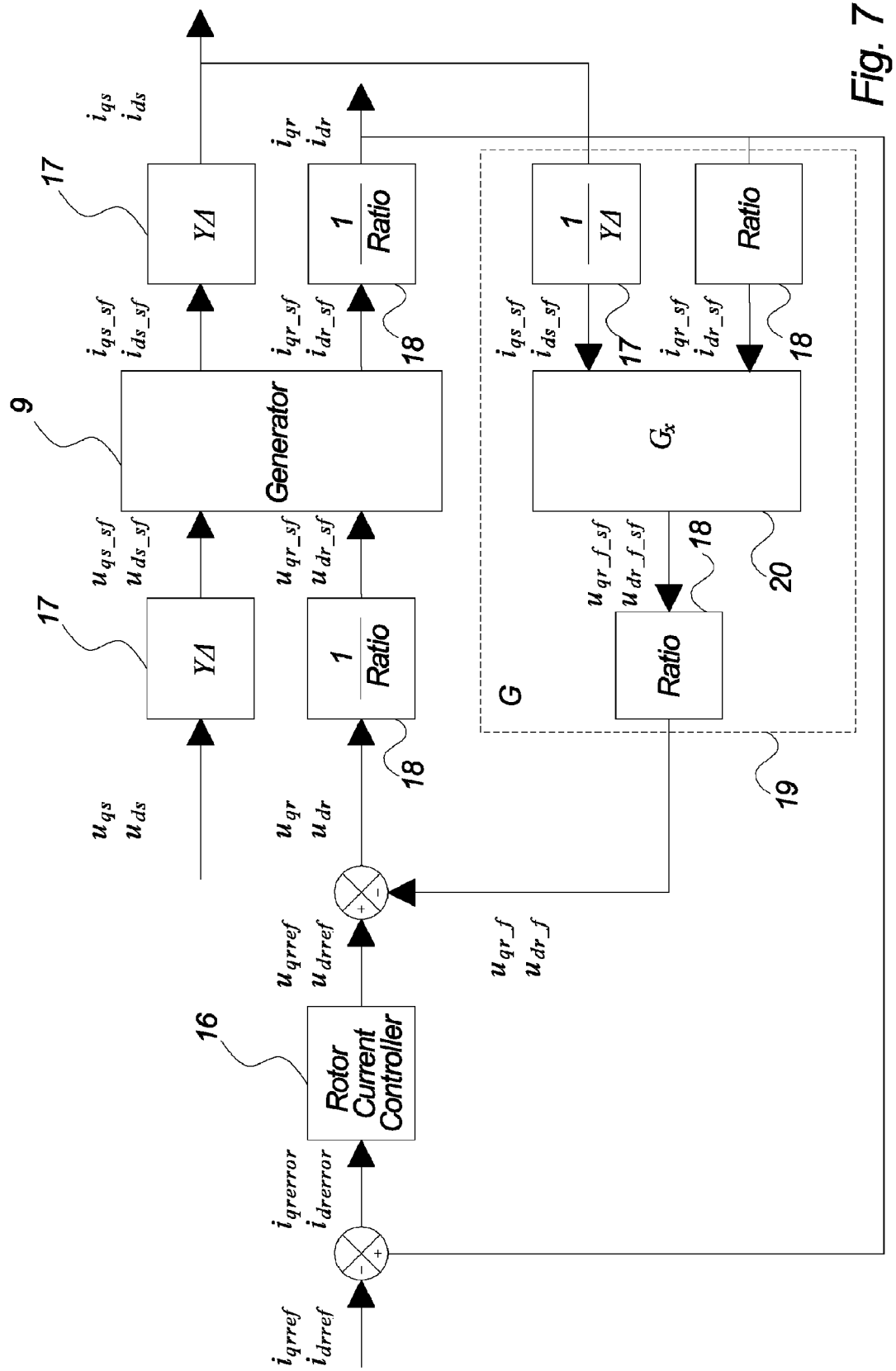
FIG. 7 illustrates the same extended model of a doubly-fed induction generator as in FIG. 6 with the addition of compensation means.

Having the extended generator model in place, the compensation means providing a control output signal to be added to the rotor voltage reference, according to an embodiment of the invention, can be added to the model as illustrated in FIG. 7. Now, the resulting state space equations for the compensated system looks as follows (noting that it is the matrix G representing the total compensation means 19 and not the internal compensation matrix $G_x$ 20 that is used in the equations):

$$s \begin{bmatrix} i_{ds\_sf} \\ i_{qs\_sf} \\ i_{dr\_sf} \\ i_{qr\_sf} \end{bmatrix} = M_i \cdot \begin{bmatrix} i_{ds\_sf} \\ i_{qs\_sf} \\ i_{dr\_sf} \\ i_{qr\_sf} \end{bmatrix} + (-M_u) \cdot S_c \cdot \left( \begin{bmatrix} u_{ds} \\ u_{qs} \\ u_{drref} \\ u_{qrref} \end{bmatrix} - \begin{bmatrix} u_{dr\_f} \\ u_{qr\_f} \end{bmatrix} \right) \quad (9)$$

$$\begin{bmatrix} i_{ds} \\ i_{qs} \\ i_{dr} \\ i_{qr} \end{bmatrix} = S_c \cdot \begin{bmatrix} i_{ds\_sf} \\ i_{qs\_sf} \\ i_{dr\_sf} \\ i_{qr\_sf} \end{bmatrix}$$

which is equal to $$s \begin{bmatrix} i_{ds\_sf} \\ i_{qs\_sf} \\ i_{dr\_sf} \\ i_{qr\_sf} \end{bmatrix} = M_i \cdot \begin{bmatrix} i_{ds\_sf} \\ i_{qs\_sf} \\ i_{dr\_sf} \\ i_{qr\_sf} \end{bmatrix} + (-M_u) \cdot S_c \cdot \begin{bmatrix} \begin{bmatrix} u_{ds} \\ u_{qs} \end{bmatrix} \\ \begin{bmatrix} u_{drref} \\ u_{qrref} \end{bmatrix} - G \cdot \begin{bmatrix} i_{ds} \\ i_{qs} \\ i_{dr} \\ i_{qr} \end{bmatrix} \end{bmatrix} \quad (10)$$

$$\begin{bmatrix} i_{ds} \\ i_{qs} \\ i_{dr} \\ i_{qr} \end{bmatrix} = S_c \cdot \begin{bmatrix} i_{ds\_sf} \\ i_{qs\_sf} \\ i_{dr\_sf} \\ i_{qr\_sf} \end{bmatrix} \quad \text{where}$$

$$S_c = \begin{bmatrix} Y\Delta & 0 & 0 & 0 \\ 0 & Y\Delta & 0 & 0 \\ 0 & 0 & 1/\text{Ratio} & 0 \\ 0 & 0 & 0 & 1/\text{Ratio} \end{bmatrix} \quad (11)$$

Now, (10) can be reduced to $$s \begin{bmatrix} i_{ds\_sf} \\ i_{qs\_sf} \\ i_{dr\_sf} \\ i_{qr\_sf} \end{bmatrix} = M_i \cdot \begin{bmatrix} i_{ds\_sf} \\ i_{qs\_sf} \\ i_{dr\_sf} \\ i_{qr\_sf} \end{bmatrix} + [B_l \; B_r] \cdot \begin{bmatrix} \begin{bmatrix} u_{ds} \\ u_{qs} \end{bmatrix} \\ \begin{bmatrix} u_{drref} \\ u_{qrref} \end{bmatrix} - G \cdot S_c \cdot \begin{bmatrix} i_{ds\_sf} \\ i_{qs\_sf} \\ i_{dr\_sf} \\ i_{qr\_sf} \end{bmatrix} \end{bmatrix} \quad (12)$$

using $$[B_l \; B_r] = -M_u \cdot S_c \Rightarrow \quad (13)$$

$$B_r = \frac{1}{\text{Ratio} \cdot (L_s \cdot L_r - L_{sr}^2)} \begin{bmatrix} L_{sr} & 0 \\ 0 & L_{sr} \\ -L_s & 0 \\ 0 & -L_s \end{bmatrix}$$

or, in a rewritten form:

$$s \begin{bmatrix} i_{ds\_sf} \\ i_{qs\_sf} \\ i_{dr\_sf} \\ i_{qr\_sf} \end{bmatrix} = (M_i - B_r \cdot G \cdot S_c) \cdot \begin{bmatrix} i_{ds\_sf} \\ i_{qs\_sf} \\ i_{dr\_sf} \\ i_{qr\_sf} \end{bmatrix} + (-M_u) \cdot S_c \cdot \begin{bmatrix} u_{ds} \\ u_{qs} \\ u_{drref} \\ u_{qrref} \end{bmatrix} \quad (14)$$

$$\begin{bmatrix} i_{ds} \\ i_{qs} \\ i_{dr} \\ i_{qr} \end{bmatrix} = S_c \cdot \begin{bmatrix} i_{ds\_sf} \\ i_{qs\_sf} \\ i_{dr\_sf} \\ i_{qr\_sf} \end{bmatrix} + 0_{\{4 \times 4\}} \cdot \begin{bmatrix} u_{ds} \\ u_{qs} \\ u_{dr} \\ u_{qr} \end{bmatrix}$$

The compensation means matrix G 19 can be chosen in a number of ways depending on the effect required by the compensation means.

In an embodiment of the invention, the matrix G 19 is chosen in a way that at the same time eliminates every appearance of the electrical rotor speed in the elements of the resulting dynamic matrix of the compensated system and effectively decouples the currents into d and q components. For this purpose, G 19 is set to be:

$$G = \text{Ratio} \cdot \quad (15)$$

$$\begin{bmatrix} 0 & \frac{\omega_r \cdot L_{sr}}{Y\Delta} & 0 & -\text{Ratio} \cdot \left( \frac{(\omega - \omega_r) \cdot}{L_r - \frac{\omega \cdot L_{sr}^2}{L_s}} \right) \\ -\frac{\omega_r \cdot L_{sr}}{Y\Delta} & 0 & \text{Ratio} \cdot \left( \frac{(\omega - \omega_r) \cdot}{L_r - \frac{\omega \cdot L_{sr}^2}{L_s}} \right) & 0 \end{bmatrix}$$

With this choice of G 19, we get the following matrix product $B_r \cdot G \cdot S_c$:

$$B_r \cdot G \cdot S_c = \quad (16)$$

$$\frac{\begin{bmatrix} 0 & \omega_r \cdot L_{sr}^2 & 0 & \begin{matrix} -(\omega - \omega_r) \cdot L_r \cdot \\ L_{sr} + \frac{\omega \cdot L_{sr}^3}{L_s} \end{matrix} \\ -\omega_r \cdot L_{sr}^2 & 0 & \begin{matrix} (\omega - \omega_r) \cdot L_r \cdot \\ L_{sr} - \frac{\omega \cdot L_{sr}^3}{L_s} \end{matrix} & 0 \\ 0 & -\omega_r \cdot L_s L_{sr} & 0 & \begin{matrix} (\omega - \omega_r) \cdot L_s \cdot \\ L_r - \omega \cdot L_{sr}^2 \end{matrix} \\ \omega_r \cdot L_s L_{sr} & 0 & \begin{matrix} -(\omega - \omega_r) \cdot L_s \cdot \\ L_r + \omega \cdot L_{sr}^2 \end{matrix} & 0 \end{bmatrix}}{L_s \cdot L_r - L_{sr}^2}$$

which, when subtracted from $M_i$ gives us the following dynamic matrix of the system:

$$M_i - B_r \cdot G \cdot S_c = \quad (17)$$

$$\frac{\begin{bmatrix} -L_r \cdot R_s & \omega \cdot \left( L_s \cdot L_r - L_{sr}^2 \right) & L_{sr} R_r & \omega \cdot \left( L_r \cdot L_{sr} - \frac{L_{sr}^3}{L_s} \right) \\ -\omega \cdot \left( L_s \cdot L_r - L_{sr}^2 \right) & -L_r \cdot R_s & -\omega \cdot \left( L_r \cdot L_{sr} - \frac{L_{sr}^3}{L_s} \right) & L_{sr} R_r \\ L_{sr} R_s & 0 & -L_s \cdot R_r & 0 \\ 0 & L_{sr} R_s & 0 & -L_s \cdot R_r \end{bmatrix}}{(L_s \cdot L_r - L_{sr}^2)}$$

Thus, using a compensation means matrix G 19 that depends on the electrical rotor speed $\omega_r$, it is possible to achieve a resulting dynamic matrix $A = M_i - B_r \cdot G \cdot S_c$ which is independent of $\omega_r$.

This independency of $\omega_r$ means that the poles and zeros of the system equations do not more move when the rotor speed changes and that a dedicated effort can be made to dampen possible oscillations and instabilities arising from these poles and zeros, because their positions are now well-known.

Figure 8:
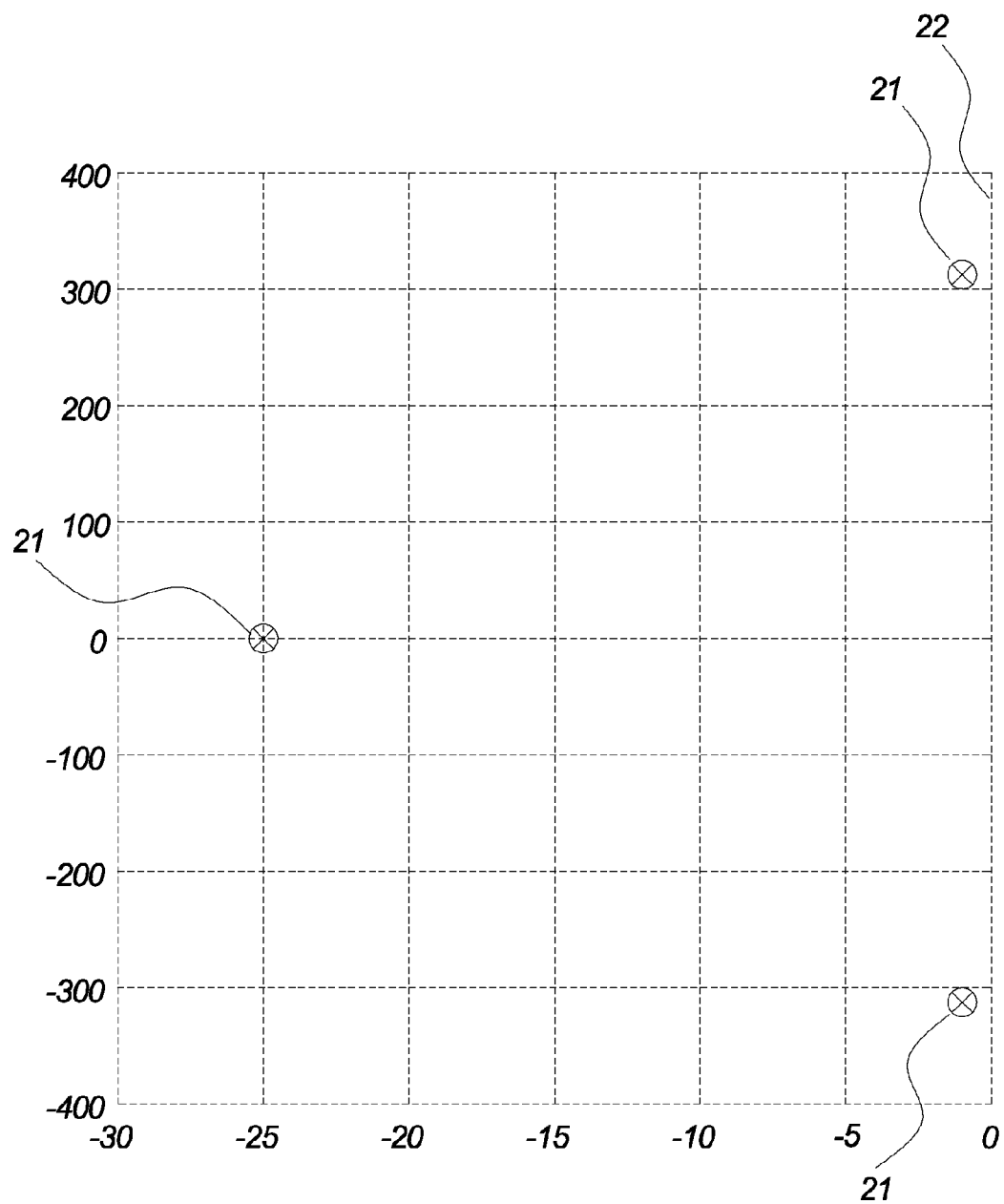
FIG. 8 illustrates the positions of poles and zeros for the system equations of the described embodiment of the invention.

FIG. 8 shows the positions 21 of the poles x and zeros 0 for the system with the above mentioned definition of the compensation means matrix G 19. The left point 21 near $\{-25, 0\}$ consists of one zero 0 and two poles x, whereas each of the two complex conjugated points 21 close to the stability limit 22 consists of one zero 0 and one pole x.

The above-mentioned poles and zeros near the stability limit can easily be the cause of oscillations. Therefore, the present invention also comprises damping means dedicated for damping this type of oscillations.

Figure 9:
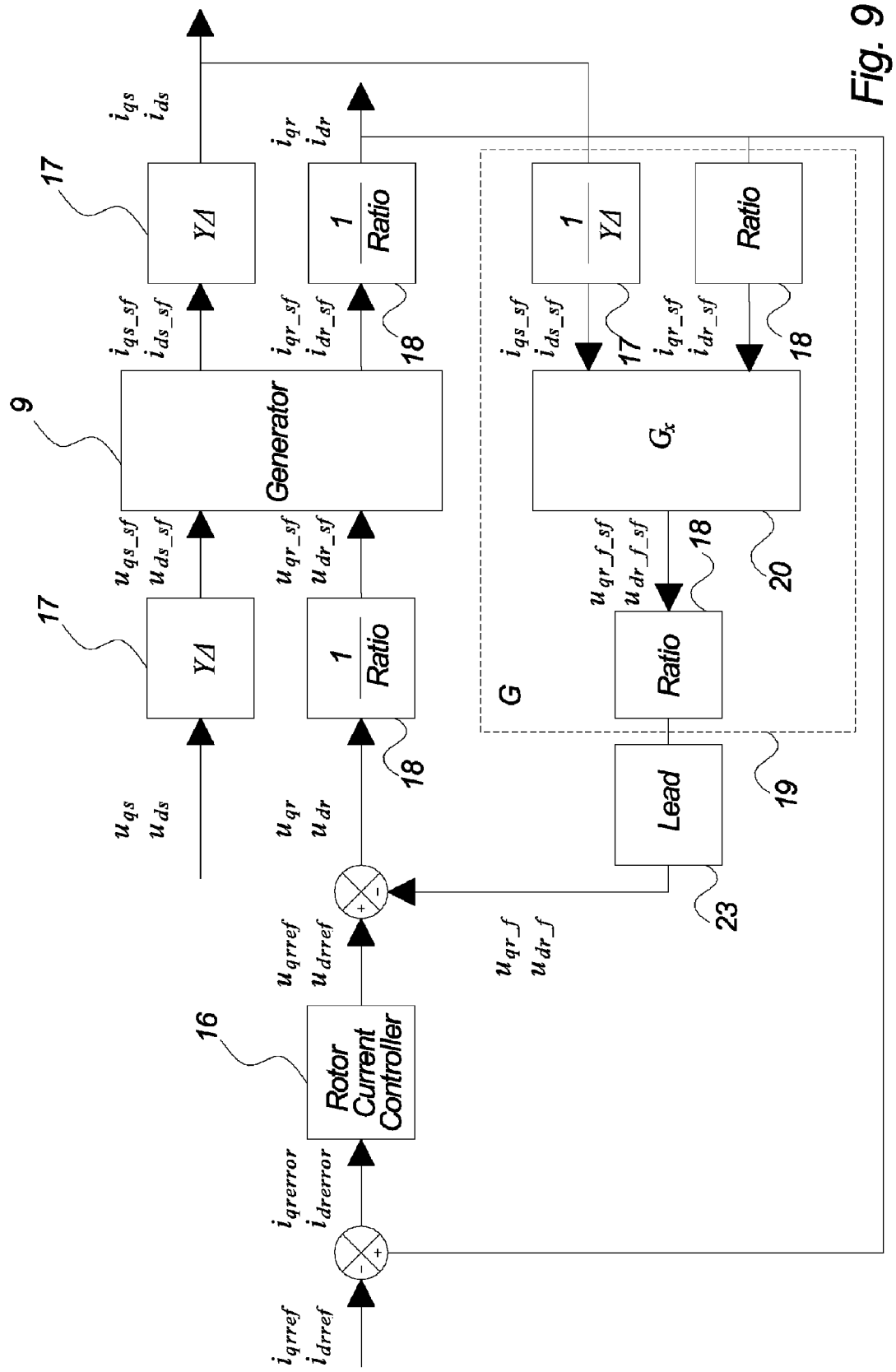
FIG. 9 illustrates the extended model of a compensated doubly-fed induction generator as in FIG. 7 with the addition of a lead compensation filter.

In an aspect of the invention, the damping means comprise a lead filter 23 positioned in the compensation means loop of the system as shown in FIG. 9.

Figure 10:
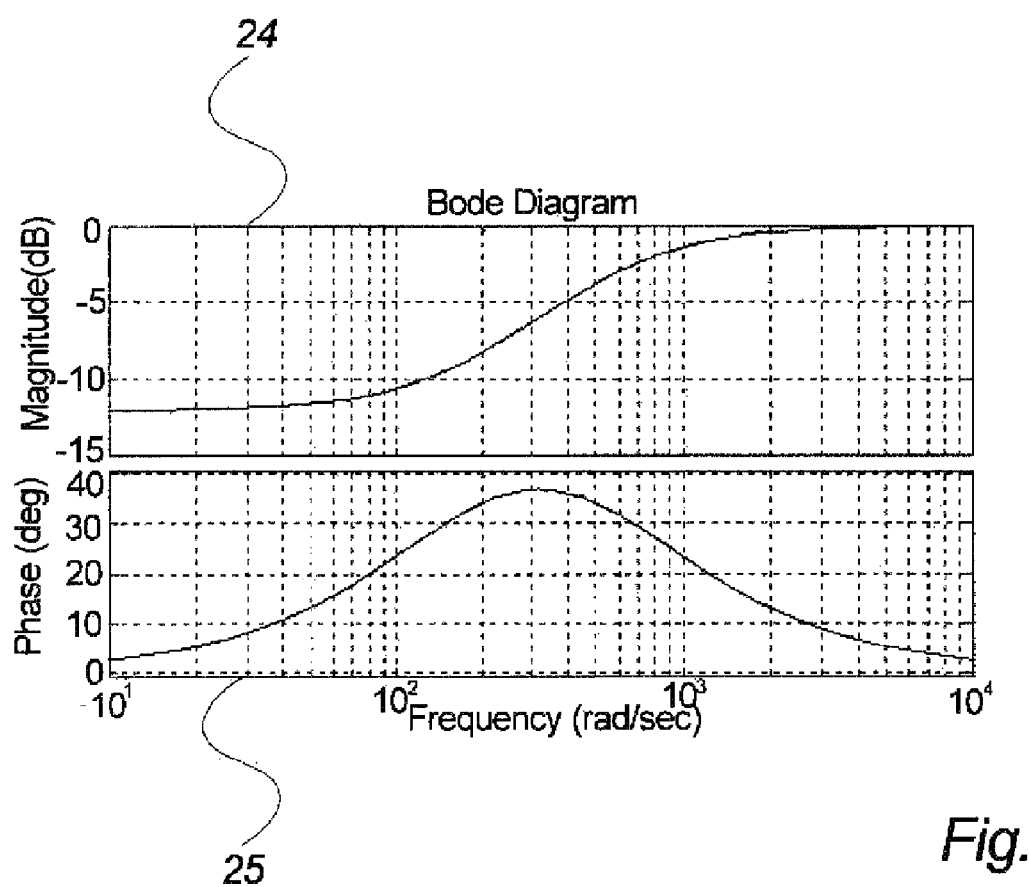
FIG. 10 illustrates the Bode diagram of a lead compensation filter.

The lead filter 23 whose Bode diagram is shown in FIG. 10 has the following transfer function, where LF is the Lead Factor of the filter:

$$\text{Lead} = \frac{s + \frac{\omega}{LF}}{s + LF \cdot \omega} \quad (18)$$

If LF is set to the value 2, the above transfer function gives a phase advance of around 35° at the grid frequency. The high frequency gain is 1, and the DC gain is $$\frac{1}{LF^2}.$$

The general idea is that the lead filter 23 should have no influence at high frequencies, and that the rotor control loop is fast enough to compensate for the lower gain at low frequencies.

Figure 11A:
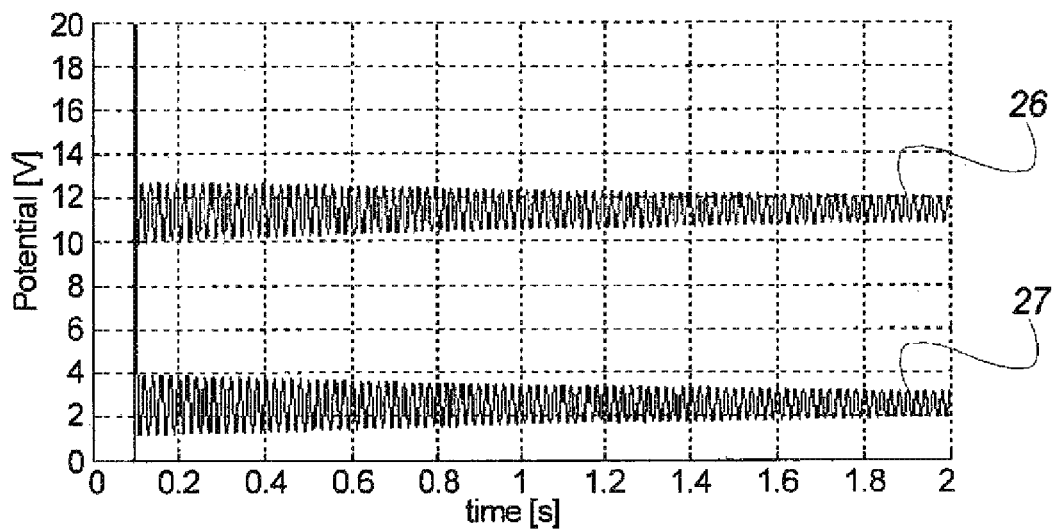
FIG. 11a illustrates the step response of rotor voltages along the d- and q-axes, respectively, to a 100 A impulse in a system without a lead compensation filter.
Figure 11B:
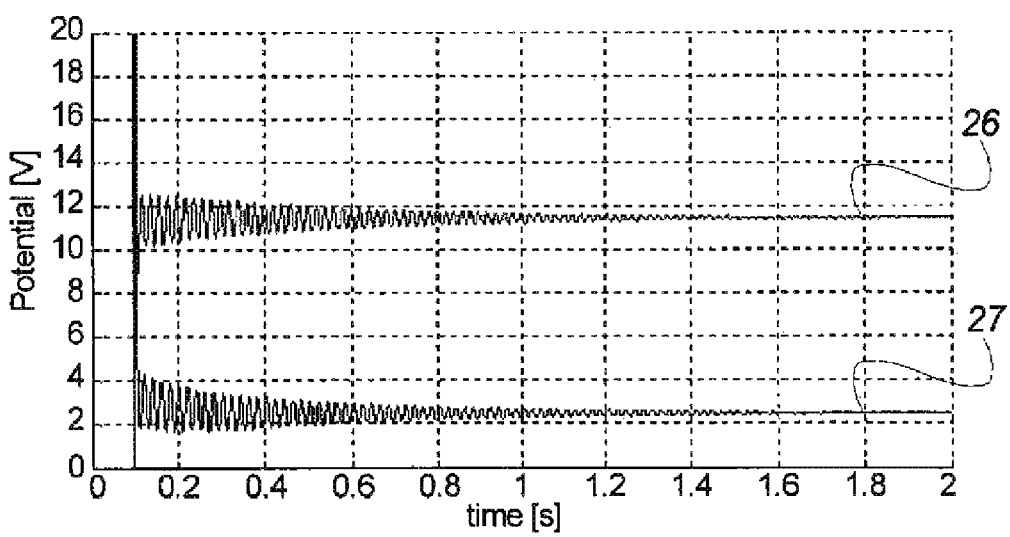
FIG. 11b illustrates the step response of rotor voltages along the d- and q-axes, respectively, to a 100 A impulse in a system with a lead compensation filter.

The effect of the lead filter 23 is illustrated in FIG. 11a and 11b, which shows the step responses of the q-axis 26 and d-axis 27 rotor voltages to a 100 A impulse in systems without and with a compensating lead filter 23, respectively.

In practice, the lead filter often consists of two independent filters working on the d and q components, respectively.

What is claimed is:

1. A variable rotational speed wind turbine comprising
    a wind turbine rotor comprising one or more blades,
    a doubly-fed induction generator coupled to the wind turbine rotor,
    a rotor current controller arranged to control currents of a rotor of the generator,
    compensation means having computation means, and
    means for providing input to the compensation means, the input being representative of at least an instantaneous angular speed of the rotor of the generator,
wherein the computation means is arranged to compute an instantaneous compensation control output in dependency of said instantaneous angular speed of the rotor of the generator and feed the compensation control output to the rotor of the generator, the computation means being arranged to compute said compensation control output during operation of the wind turbine to compensate at least partly for dependencies on the rotor angular speed of the locations of poles of a generator transfer function, thus making a resulting generator transfer function substantially independent of variations in the rotor angular speed during operation of the wind turbine.

2. The wind turbine according to claim 1, wherein the compensation control output is added to an output from the rotor current controller.

3. The wind turbine according to claim 1, wherein the means for providing input to the compensation means furthermore provides input representing electrical quantities.

4. The wind turbine according to claim 3, wherein said electrical quantities are currents and voltages.

5. The wind turbine according to claim 3, wherein said input includes a rotor reference current.

6. The wind turbine according to claim 3, wherein said input includes stator currents.

7. The wind turbine according to claim 3, wherein said input includes rotor currents.

8. The wind turbine according to claim 3, wherein the transfer function of the compensation means furthermore is designed for computing the control output so that the rotor currents are effectively decoupled into two mutually orthogonal components that may be controlled substantially independently by the rotor current controller.

9. The wind turbine according to claim 1, wherein the compensation means comprises means for providing damping of oscillations of the control output.

10. The wind turbine according to claim 9, wherein the means for providing damping of oscillations comprises one or more lead filters.

11. The wind turbine according to claim 9, wherein the means for providing damping of oscillations are designed to provide damping at a frequency that deviates less than 5% from a grid frequency.

12. The wind turbine according to claim 9, wherein the means for providing damping of oscillations are tuneable to one or more well-defined frequencies.

13. A method for operating a variable rotational speed wind turbine having a doubly-fed induction generator coupled to a rotor of the wind turbine, comprising the steps of:
    providing input to compensation means, the input being representative of at least an instantaneous angular speed of a rotor of the generator,
    arranging computation means of the compensation means to compute an instantaneous compensation control output in dependency of said instantaneous angular speed of the rotor of the generator during operation of the wind turbine to compensate at least partly for dependencies on the rotor angular speed of locations of poles of a generator transfer function, thus making a resulting generator transfer function substantially independent of variations in the rotor angular speed during operation of the wind turbine, and
    feeding the compensation control output to the rotor of the generator.

14. The method according to claim 13, further comprising the step of arranging the computation means for computing the control output so that rotor currents are effectively decoupled into two mutually orthogonal components that may be controlled substantially independently by a rotor current controller.

15. The method according to claim 13, further comprising the step of arranging the compensation means for providing damping of oscillations of the control output.

16. The method according to claim 15, wherein the provided damping of oscillations is tuneable to one or more well-defined frequencies.

* * * * *